(12) United States Patent
Song et al.

(10) Patent No.: US 11,389,766 B2
(45) Date of Patent: Jul. 19, 2022

(54) SYSTEM AND METHOD FOR SEPARATING XENON-KRYPTON MIXED GAS BY HYDRATE FORMATION PROCESS

(71) Applicant: DALIAN UNIVERSITY OF TECHNOLOGY, Liaoning (CN)

(72) Inventors: Yongchen Song, Liaoning (CN); Jiafei Zhao, Liaoning (CN); Xianwei Guo, Liaoning (CN); Lei Yang, Liaoning (CN); Weiguo Liu, Liaoning (CN); Mingjun Yang, Liaoning (CN); Yanghui Li, Liaoning (CN); Zheng Ling, Liaoning (CN); Yu Liu, Liaoning (CN); Yi Zhang, Liaoning (CN); Dayong Wang, Liaoning (CN); Lanlan Jiang, Liaoning (CN); Yuechao Zhao, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/968,817

(22) PCT Filed: Apr. 9, 2019

(86) PCT No.: PCT/CN2019/081844
§ 371 (c)(1),
(2) Date: Aug. 10, 2020

(87) PCT Pub. No.: WO2020/206599
PCT Pub. Date: Oct. 15, 2020

(65) Prior Publication Data
US 2021/0146301 A1 May 20, 2021

(51) Int. Cl.
*B01D 53/22* (2006.01)
*B01D 53/34* (2006.01)
(Continued)

(52) U.S. Cl.
CPC .......... *B01D 53/46* (2013.01); *B01D 53/229* (2013.01); *B01D 53/346* (2013.01);
(Continued)

(58) Field of Classification Search
CPC ................ B01D 53/229; B01D 53/346; B01D 53/1425; B01D 53/1418; B01D 2258/02;
(Continued)

(56) References Cited

U.S. PATENT DOCUMENTS 3,806,583 A * 4/1974 Dewell ................ G21C 19/303
423/262
3,922,150 A * 11/1975 Yusa ...................... F25J 3/0285
95/96

(Continued)

FOREIGN PATENT DOCUMENTS

CN         1537667 A      10/2004
CN       102448579 A       5/2012
(Continued)

*Primary Examiner* — Timothy C Vanoy
(74) *Attorney, Agent, or Firm* — Muncy, Geissler, Olds & Lowe, P.C.

(57) ABSTRACT

The invention provides a method and system for separating xenon-krypton mixed gas by hydrate formation process. The system is mainly composed of a gas hydrate generating unit, a heat exchanging unit and a gas-water separating unit: pre-cooled xenon-krypton mixed gas is injected from a bottom of a reaction tower, xenon gas in the mixed gas and water attached to a porous tray generate a xenon gas hydrate; and water is injected from a top of the tower to wet the porous tray, a generated hydrate particle is washed and collected to the bottom of the tower simultaneously to form a hydrate slurry, after passing through the heat exchanging unit, the xenon gas hydrate in the slurry is decomposed to form a gas phase flow and a water phase flow, and then
(Continued)

enters the gas-water separating unit, and the xenon gas is separated from decomposed water.

4 Claims, 2 Drawing Sheets

(51) Int. Cl.
*B01D 53/46* (2006.01)
*C01B 23/00* (2006.01)

(52) U.S. Cl.
CPC ...... *C01B 23/0094* (2013.01); *B01D 2257/11* (2013.01); *B01D 2258/02* (2013.01); *B01D 2319/06* (2013.01)

(58) Field of Classification Search
CPC ................ B01D 2256/18; B01D 53/46; B01D 2319/06; B01D 2252/103; B01D 53/1493; B01D 2257/11; B01D 59/00; C01B 23/0094; C01B 23/00; C01B 23/001; G21F 9/007; G21F 9/02
See application file for complete search history.

(56) References Cited

U.S. PATENT DOCUMENTS

| 4,054,427 | A | * | 10/1977 | Schroeter | B01D 53/02 |
| | | | | | 95/97 |
| 4,371,383 | A | * | 2/1983 | Rost | G21F 9/02 |
| | | | | | 96/164 |
| 4,400,183 | A | * | 8/1983 | Henrich | C01B 23/00 |
| | | | | | 95/180 |
| 4,816,041 | A | * | 3/1989 | Ringel | B01D 53/04 |
| | | | | | 95/127 |
| 6,565,821 | B1 | * | 5/2003 | Fraysse | B01D 53/229 |
| | | | | | 423/240 R |
| 2014/0270046 | A1 | * | 9/2014 | Bertolotto | G21F 9/02 |
| | | | | | 376/309 |
| 2016/0184768 | A1 | | 6/2016 | Bagajewicz et al. | |

FOREIGN PATENT DOCUMENTS

| CN | 107063784 A | 8/2017 |
| CN | 107344063 A | 11/2017 |
| CN | 109420417 A | 3/2019 |
| JP | 2003-267711 A | 9/2003 |

* cited by examiner

SYSTEM AND METHOD FOR SEPARATING XENON-KRYPTON MIXED GAS BY HYDRATE FORMATION PROCESS

TECHNICAL FIELD

The present invention belongs to the field of hydrate-based technology, and more particularly, relates to a system and method for separating xenon-krypton mixed gas by hydrate formation process.

BACKGROUND

Nuclear energy has characteristics of no emission and high energy density, and has become a potential new energy resource to replace fossil fuels. However, highly radioactive waste gases generated during utilization of the nuclear energy must be recovered from nuclear wastes and sealed in a pressure vessel until these gases are no longer radioactive. In these radioactive waste gases, a volume ratio of xenon gas (Xe) to krypton gas (Kr) is 91:9. A radioactive element $^{85}$Kr has a half-life as long as 10.8 years, and $^{127}$Xe has a relatively short half-life (36.3 days). The above radioactive elements are easy to cause air pollution and endanger human health. Therefore, the above radioactive elements need to be recovered from waste materials. In addition, the xenon gas (Xe) is an important rare resource, which is widely used in semiconductor, laser, medical equipment and other research fields. At present, the xenon gas is mainly collected from air, with a concentration of 0.09 ppm in air. A mature method in industry is to obtain high-purity xenon gas and krypton gas (Kr) from air by low-temperature distillation. After air liquefaction, various products are obtained at different temperatures in a distillation tower, and xenon-krypton mixed gas (xenon gas/krypton gas=20/80, v/v) is finally obtained. If the xenon gas is able to be separated from the waste gases of the nuclear industry, not only a treatment capacity of the waste gases is reduced, but also sources and an output of the xenon gas are able to be increased.

At present, a method for separating the xenon gas from the krypton gas mainly includes low-temperature distillation and solid adsorption separation. A principle of the low-temperature distillation is to separate components in the distillation tower through multiple processes of partial condensation and partial evaporation by using different boiling points of the xenon gas and the krypton gas (xenon gas: −108.12° C., krypton gas: −153.22° C.). The method is difficult in technology, and is extremely strict in requirements of production operation procedures. A device needs to withstand a test of high pressure and low temperature, and has a huge energy consumption. The solid adsorption separation method is to use a selective adsorption property of an adsorbent to realize separation or purification of gas components. The method has a low energy consumption for generation and a high separation efficiency, but has an expensive preparation cost, thus being not suitable for large-scale commercial production.

The hydrate formation process is a new gas separation technology. A principle thereof is to preferentially combine components which are easy to form hydrate in the mixed gas with water to generate the hydrate by using different phase equilibrium conditions and difficulty levels of different gases to form the hydrate. Gas molecules are wrapped in a cage-like structure formed by the water molecules, thus realizing effective separation of the mixed gas. Phase equilibrium pressures corresponding to a xenon hydrate and a krypton hydrate are 0.17 MPa and 1.82 MPa respectively at 2° C. A huge phase equilibrium difference provides a theoretical basis for the separation of the xenon gas from the xenon-krypton mixed gas by the hydrate formation process.

SUMMARY

The present invention is mainly intended to provide a method and system for separating xenon-krypton mixed gas by hydrate formation process.

The present invention is realized by the following technical solutions.

A system for separating xenon-krypton mixed gas by hydrate formation process includes a gas hydrate generating unit, a heat exchanging unit and a gas-water separating unit, wherein:

a main device of the gas hydrate generating unit is a reaction tower, pre-cooled xenon-krypton mixed gas is injected into the tower from a bottom of the reaction tower through a gate valve A and a flow control valve A, a gas-liquid separating membrane is placed at a bottom of a porous tray where the mixed gas contacts first, an interfacial area of the gas-liquid separating membrane is larger than a cross-sectional area of the reaction tower, and the gas-liquid separating membrane is built between the porous tray and the bottom of the tower in an inclined manner to prevent a hydrate slurry from blocking an air inlet of the bottom of the tower, and guiding converging of the hydrate slurry simultaneously;

when the mixed gas moves upwards in the reaction tower, the xenon gas contacts with water attached to the porous tray to generate a xenon hydrate particle, residual gas is discharged from a top of the reaction tower, and a back-pressure control valve is installed at an outlet of the top of the reaction tower to stabilize an air pressure in the reaction tower, and ensure continuous generation of a xenon hydrate in the tower; and pre-cooled water is injected from the top of the tower through a gate valve B and a flow control valve F, which is used to generate the hydrate on one hand, and washes the hydrate particle on the porous tray to a space enclosed by the gas-liquid separating membrane and a tower wall to converge into the hydrate slurry to enter the heat exchanging unit through a flow control valve B on the other hand;

main devices of the heat exchanging unit are a heat exchanger A and a heat exchanger B, and the hydrate slurry enters the heat exchanging unit through two paths after passing through a fluid diversion device; one path of the hydrate slurry enters the heat exchanger B as a cold fluid after being pressurized by a flow control valve C and a delivery pump B, a hot fluid of the heat exchanger B is decomposed water from the gas-water separating unit, the hydrate particle in the slurry is decomposed by absorbing heat carried by the decomposed water through heat exchange between the cold and hot fluids, the hydrate slurry is converted into a gas phase flow and a water phase flow, and enters the gas-water separating unit through a delivery pump E, and the cooled decomposed water is injected into the reaction tower through a delivery pump G and a flow control valve F; the other path of the hydrate slurry enters the heat exchanger A as a cold fluid after passing through a flow control valve D and a delivery pump A, a hot fluid of the heat exchanger A is normal-temperature xenon-krypton mixed gas pressurized by a delivery pump D, the hydrate particle in the slurry is decomposed by absorbing heat carried by the normal-temperature mixed gas through heat exchange between the cold and hot fluids, the hydrate slurry is converted into a gas phase flow and a water phase flow, and enters the gas-water separating unit through the delivery pump E, and the cooled mixed gas enters the reaction tower through a delivery pump C and a flow control valve A; the heat exchanging unit makes full use of heat carried by a raw material (the normal-temperature xenon-krypton mixed gas and the decomposed water), and realizes hydrate decomposition and pre-cooling of the raw material with lower energy consumption;

a main device of the gas-water separating unit is a gas-water separating tower, the gas phase flow and the water phase flow containing the xenon gas are injected from a middle position of the gas-water separating tower after being pressurized by the delivery pump E, under an action of gravity, the xenon gas is separated from the decomposed water, wherein the xenon gas rises to the top of the tower, and is discharged by a flow control valve E after being dehumidified by a drying bed; and the decomposed water sinks to the bottom of the tower, and enters the heat exchanger B to participate in the heat exchange after being pressurized by a delivery pump F; and the decomposed water of the hydrate contains a large number of xenon micro-nano bubbles, and a generation rate of the xenon hydrate can be greatly improved by injecting the decomposed water back into the reaction tower to participate in generation of the hydrate.

Further, under a working condition of a large mixed gas treatment capacity, the apparatus further includes a refrigerator A and a refrigerator B, which are respectively used for auxiliary cooling of the xenon-krypton mixed gas from the heat exchanger A and the decomposed water from the heat exchanger B to ensure that pre-cooling temperatures of the mixed gas and the decomposed water reach set temperatures of the working condition; and an electric heating device performs auxiliary heating on the gas phase flow and the water phase flow from the heat exchanger A and the heat exchanger B to ensure that the hydrate particle in the fluid is completely decomposed.

Further, the above porous tray is especially made of plate-like foamy copper with a porosity of 40% to 50% obtained by powder metallurgy or electroplating; and surface treatment is performed on the foamy copper by a dry corrosion method to increase a roughness of a metal surface, thus providing more sites for hydrate nucleation.

The present invention further provides a method for separating xenon-krypton mixed gas by hydrate formation process by using the above apparatus, which includes the following steps:

step 1. injecting normal-temperature water from a side surface of the top of the reaction tower, wherein the water flows through all porous trays from top to bottom, then converges in the space enclosed by the gas-liquid separating membrane and the tower wall, and enters and is stored in the gas-water separating tower after passing through the fluid diversion device, the heat exchanger A and the heat exchanger B as the hot fluid of the heat exchanger when the system is started up;

step 2. adjusting the back-pressure control valve at the top of the reaction tower to a preset working condition pressure; injecting the pre-cooled water from the side surface of the reaction tower, after wetting the porous tray, injecting the pre-cooled xenon-krypton mixed gas from the bottom of the tower to generate the xenon hydrate with water on the porous tray, increasing an inlet water flow by the flow control valve F, so that the water washes the hydrate particle on the tray into the space enclosed by the gas-liquid separating membrane and the tower wall, and the hydrate particle converges into the hydrate slurry to enter the heat exchanging unit; and discharging the residual gas from the top of the tower;

step 3. starting up the fluid diversion device to divide the hydrate slurry into two paths, wherein one path of the hydrate slurry enters the heat exchanger B as the cold fluid, the delivery pump F at the bottom of the gas-water separating tower is started up, the pre-stored normal-temperature water enters the heat exchanger B as the hot fluid, after heat exchange, the hydrate particle in the cold fluid is decomposed, and converted into the gas phase flow and the water phase flow to enter the gas-water separating unit, the cooled water is injected into the reaction tower through the pump, after the whole system is operated, the normal-temperature water is replaced by the decomposed water from the gas-water separating unit, and the decomposed water enters the heat exchanger B as the hot fluid; and the other path of the hydrate slurry enters the heat exchanger A as the cold fluid, the delivery pump D is started up, the mixed gas to be separated is injected into the heat exchanger A as the hot fluid, after heat exchange, the hydrate particle in the cold fluid is decomposed, and converted into the gas phase flow and the water phase flow to enter the gas-water separating unit, and the cooled mixed gas is injected into the reaction tower through the delivery pump C; and step 4. starting up the delivery pump E to inject the gas phase flow and the water phase flow from the middle position of the gas-water separating tower, and separating the xenon gas from the decomposed water under the action of gravity, wherein the xenon gas moves upwards to the drying bed and is produced after dehumidification; and the decomposed water converges at the bottom of the tower, and enters the heat exchanger B as the hot fluid through the delivery pump F.

The present invention has the beneficial effects that: the xenon gas is continuously separated from the mixed gas at 0° C. and a low pressure (0.5 MPa to 2 MPa), the foamy copper plate is used as the porous tray, and the surface treatment is performed on the porous tray, so that generation sites of the xenon hydrate are able to be increased, the generation rate of the hydrate is accelerated, and the hydrate particle is able to be fluidized, thus continuously separating the xenon gas from the mixed gas; the xenon hydrate is decomposed by using a gas source of the mixed gas and the heat carried by the decomposed water, thus avoiding energy consumption caused by thermal decomposition of hydrate; meanwhile, the refrigerator and the electric heating device are used as auxiliary heat exchanging devices, which may make the separation system meet requirements for separating the xenon gas from the mixed gas under a large treatment capacity; and the system has low requirements on pressure resistance and heat preservation of equipment, and is able to continuously separate the xenon gas from the mixed gas with low energy consumption, thus having a great practical application value.

Figure 1:
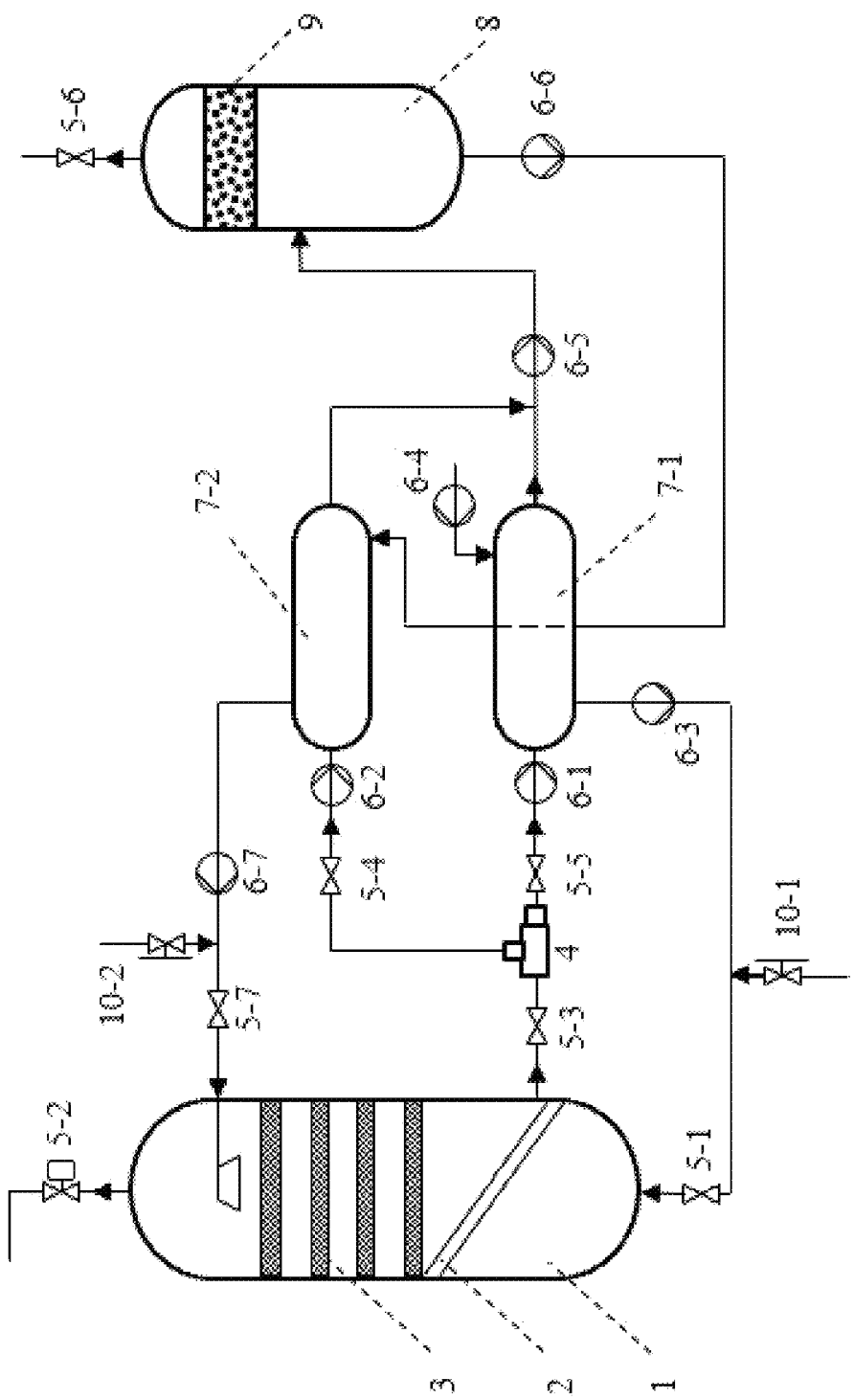
FIG. 1 is a structure diagram of a system according to the present invention.

In the drawings, 1 refers to reaction tower; 2 refers to gas-liquid separating membrane; 3 refers to porous tray; 4 refers to fluid diversion device; 5-1 refers to flow control valve A; 5-2 refers to back-pressure control valve; 5-3 refers to flow control valve B; 5-4 refers to flow control valve C;

5-5 refers to flow control valve D; 5-6 refers to flow control valve E; 5-7 refers to flow control valve F; 6-1 refers to delivery pump A; 6-2 refers to delivery pump B; 6-3 refers to delivery pump C; 6-4 refers to delivery pump D; 6-5 refers to delivery pump E; 6-6 refers to delivery pump F; 6-7 refers to delivery pump G; 7-1 refers to heat exchanger A; 7-2 refers to heat exchanger B; 8 refers to gas-water separating tower; 9 refers to drying bed; 10-1 refers to gate valve A; 10-2 refers to gate valve B; 11-1 refers to refrigerator A; 11-2 refers to refrigerator B; and 12 refers to electric heating device.

DETAILED DESCRIPTION

The present invention is further described in detail hereinafter with reference to the accompanying drawings and the specific embodiments.

Embodiment 1

In the embodiment, component proportions (v/v) of separated xenon-krypton mixed gas are Xe: 20% and Kr: 80%, which are namely intermediate products obtained during collection of xenon gas from air. Since the proportion of the xenon gas is low, an injection flow of the mixed gas needs to be controlled in a low range to ensure that the xenon gas stays in a tower for enough time to generate a hydrate with water. Therefore, a structure diagram of a system shown in FIG. 1 is selected.

Specific steps are as follows. Normal-temperature water (20° C.) is injected from a side surface of a top of a reaction tower 1. The water flows through all porous trays 3 from top to bottom, then converges in a space enclosed by a gas-liquid separating membrane 2 and a tower wall, and enters and is stored in a gas-water separating tower after passing through a fluid diversion device, a heat exchanger A and a heat exchanger B as a hot fluid of the heat exchanger when the system is started up. A back-pressure control valve 5-2 at the top of the reaction tower is adjusted to a preset working condition pressure (1.5 MPa). Pre-cooled water (0° C.) is injected from the side surface of the reaction tower, and after wetting the porous tray, the pre-cooled xenon-krypton mixed gas (0° C.) is injected from the bottom of the tower to generate a xenon hydrate with water on the porous tray. A flow control valve A5-1 is adjusted to control a gas injection flow in a low range, an inlet water flow is increased by a flow control valve F5-7, so that the water washes a hydrate particle on the tray into the space enclosed by the gas-liquid separating membrane and the tower wall, and the hydrate particle converges into a hydrate slurry to enter a heat exchanging unit. Residual gas is discharged from the top of the tower. The fluid diversion device is started up to divide the hydrate slurry into two paths. One path of the hydrate slurry enters a heat exchanger B7-2 as a cold fluid, a delivery pump F6-6 at a bottom of the gas-water separating tower is started up, and the pre-stored normal-temperature water (20° C.) enters a heat exchanger B7-2 as a hot fluid. After heat exchange, the hydrate particle in the cold fluid is decomposed, and converted into a gas phase flow and a water phase flow to enter the gas-water separating unit. The cooled water (0° C.) is injected into the reaction tower through the pump. After the whole system is operated, the normal-temperature water is replaced by decomposed water from the gas-water separating unit, and the decomposed water enters the heat exchanger B as the hot fluid for the heat exchange. The other path of the hydrate slurry enters the heat exchanger A7-1 as a cold fluid, and meanwhile, the mixed gas (20° C.) to be separated is injected into the heat exchanger A7-1 as a hot fluid. After heat exchange, the hydrate particle in the cold fluid is decomposed, and converted into a gas phase flow and a water phase flow to enter the gas-water separating unit. The cooled mixed gas (0° C.) is injected into the reaction tower through a delivery pump. A delivery pump is started up, so that the gas phase flow and the water phase flow are injected from a middle position of the gas-water separating tower, and the xenon gas is separated from the decomposed water under an action of gravity. The xenon gas moves upwards to a drying bed and is produced after dehumidification. The decomposed water converges at the bottom of the tower, and enters the heat exchanger B7-2 as the hot fluid through a delivery pump. Xe with a content of only 20% is ensured to be able to be effectively separated from the mixed gas in a form of hydrate by controlling a pressure in the reaction tower and an injection flow of the mixed gas.

Embodiment 2

Figure 2:
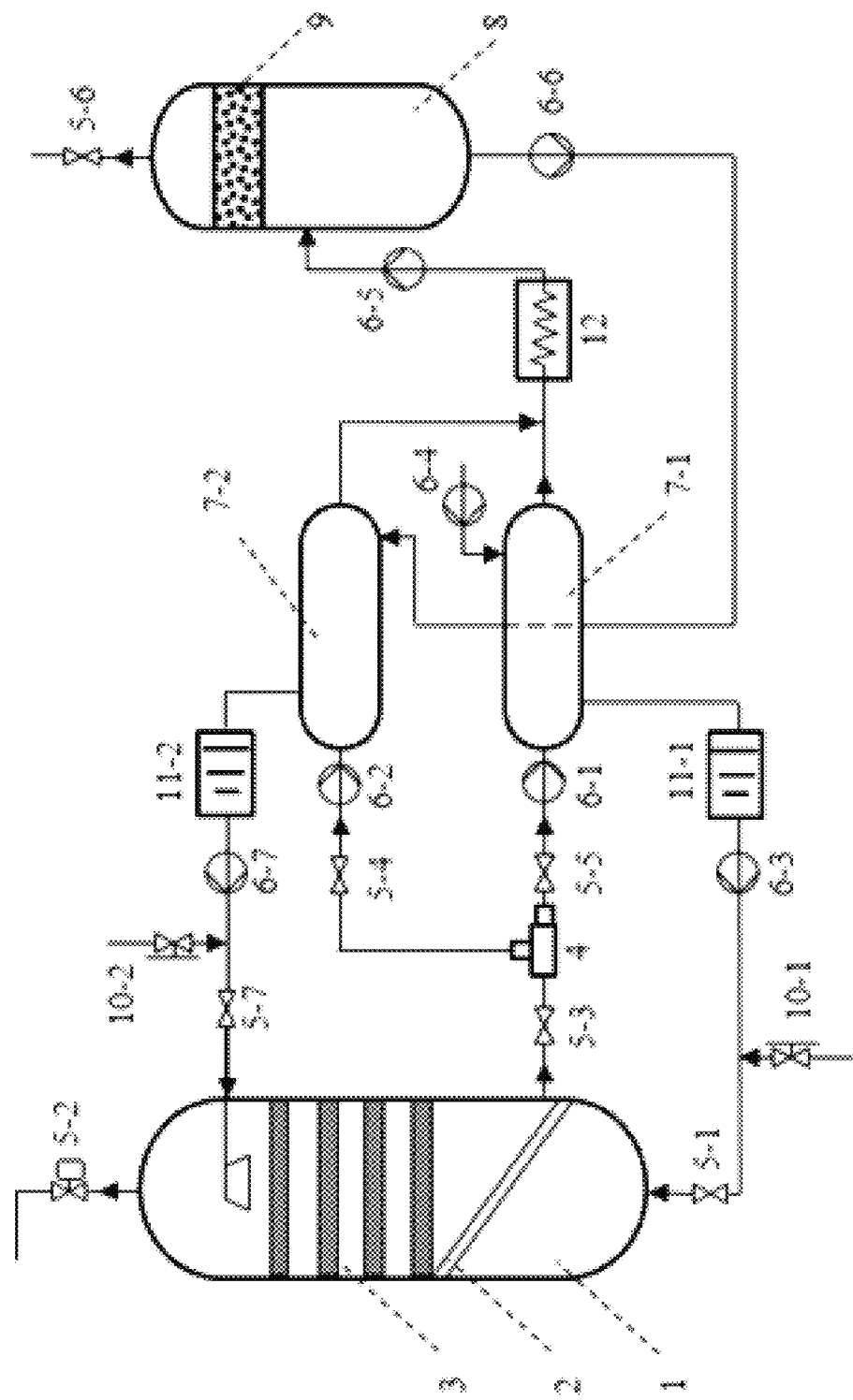
FIG. 2 is a structure diagram of a system designed for a large treatment capacity according to the present invention.

In the embodiment, component proportions (v/v) of separated xenon-krypton mixed gas are Xe: 91% and Kr: 9%, which are proportions of xenon gas and krypton gas in waste gas discharged by a nuclear industry. Since the proportion of the xenon gas is high, a gas injection flow can be increased to improve a gas treatment capacity of a system. Considering that many xenon hydrate particles exist in a hydrate slurry produced from a reaction tower, a temperature of a fluid produced after heat exchange by a heat exchanger only is unable to meet a working condition. Therefore, a diagram of a system shown in FIG. 2 is used.

Specific steps are as follows. Normal-temperature water (20° C.) is injected from a side surface of a top of the reaction tower 1. The water flows through all porous trays 3 from top to bottom, then converges in a space enclosed by a gas-liquid separating membrane 2 and a tower wall, and enters and is stored in a gas-water separating tower after passing through a fluid diversion device, a heat exchanger A and a heat exchanger B as a hot fluid of the heat exchanger when the system is started up. A back-pressure control valve at the top of the reaction tower is adjusted to a preset working condition pressure (0.5 MPa). Pre-cooled water (0° C.) is injected from the side surface of the reaction tower, and after wetting the porous tray, the pre-cooled xenon-krypton mixed gas (0° C.) is injected from the bottom of the tower to generate a xenon hydrate with water on the porous tray. An inlet water flow is increased by a flow control valve F5-7, so that the water washes a hydrate particle on the tray into the space enclosed by the gas-liquid separating membrane and the tower wall, and the hydrate particle converges into a hydrate slurry to enter a heat exchanging unit. Residual gas is discharged from the top of the tower. The fluid diversion device is started up to divide the hydrate slurry into two paths. One path of the hydrate slurry enters a heat exchanger B as a cold fluid, a delivery pump F6-6 at a bottom of the gas-water separating tower is started up, and the pre-stored normal-temperature water (20° C.) enters a heat exchanger B as a hot fluid. After heat exchange and auxiliary heating by an electric heating device, the hydrate particle in the cold fluid is completely decomposed, and converted into a gas phase flow and a water phase flow to enter the gas-water separating unit. After heat exchange and auxiliary cooling by a refrigerator B11-2, a temperature of the normal-temperature water is reduced to 0° C., and the cooled water is injected into the reaction tower. After the whole system is operated, the normal-temperature water is replaced by decomposed water from the gas-water separating unit, and the decomposed water enters the heat exchanger B7-2 as the hot fluid for the heat exchange. The other path of the hydrate slurry enters the heat exchanger A7-1 as a cold fluid, and meanwhile, the mixed gas (20° C.) to be separated is injected into the heat exchanger A7-1 as a hot fluid. After heat exchange and auxiliary heating by the electric heating device 12, the hydrate particle in the cold fluid is decomposed, and converted into a gas phase flow and a water phase flow to enter the gas-water separating unit. After heat exchange and auxiliary cooling by a refrigerator A11-1, a temperature of the mixed gas is reduced to 0° C., and the cooled mixed gas is injected into the reaction tower. A delivery pump E is started up, so that the gas phase flow and the water phase flow are injected from a middle position of the gas-water separating tower, and the xenon gas is separated from the decomposed water under an action of gravity. The xenon gas moves upwards to a drying bed and is produced after dehumidification. The decomposed water converges at the bottom of the tower, and enters the heat exchanger B7-2 as the hot fluid through a delivery pump F. The xenon gas may be efficiently separated in a form of hydrate under a working condition of a large gas treatment capacity by introducing the refrigeration device and the electric heating device 12.

The invention claimed is:

1. A system for separating xenon-krypton mixed gas by hydrate formation process, wherein including a gas hydrate generating unit, a heat exchanging unit and a gas-water separating unit, wherein:
   a main device of the gas hydrate generating unit is a reaction tower, pre-cooled xenon-krypton mixed gas is injected into the tower from a bottom of the reaction tower through a gate valve A and a flow control valve A, a gas-liquid separating membrane is placed at a bottom of a porous tray where the mixed gas contacts first, an interfacial area of the gas-liquid separating membrane is larger than a cross-sectional area of the reaction tower, and the gas-liquid separating membrane is built between the porous tray and the bottom of the tower in an inclined manner to prevent a hydrate slurry from blocking an air inlet of the bottom of the tower, and guiding converging of the hydrate slurry simultaneously;
   when the mixed gas moves upwards in the reaction tower, the xenon gas contacts with water attached to the porous tray to generate a xenon hydrate particle, residual gas is discharged from a top of the reaction tower, and a back-pressure control valve is installed at an outlet of the top of the reaction tower to stabilize an air pressure in the reaction tower, and ensure continuous generation of a xenon hydrate in the tower; and pre-cooled water is injected from the top of the tower through a gate valve B and a flow control valve F, which is used to generate the hydrate on one hand, and washes the hydrate particle on the porous tray to a space enclosed by the gas-liquid separating membrane and a tower wall to converge into the hydrate slurry to enter the heat exchanging unit through a flow control valve B on the other hand;
   main devices of the heat exchanging unit are a heat exchanger A and a heat exchanger B, and the hydrate slurry enters the heat exchanging unit through two paths after passing through a fluid diversion device; one path of the hydrate slurry enters the heat exchanger B as a cold fluid after being pressurized by a flow control valve C and a delivery pump B, a hot fluid of the heat exchanger B is decomposed water from the gas-water separating unit, the hydrate particle in the slurry is decomposed by absorbing heat carried by the decomposed water through heat exchange between the cold and hot fluids, the hydrate slurry is converted into a gas phase flow and a water phase flow, and enters the gas-water separating unit through a delivery pump E, and the cooled decomposed water is injected into the reaction tower through a delivery pump G and a flow control valve F; the other path of the hydrate slurry enters the heat exchanger A as a cold fluid after passing through a flow control valve D and a delivery pump A, a hot fluid of the heat exchanger A is normal-temperature xenon-krypton mixed gas pressurized by a delivery pump D, the hydrate particle in the slurry is decomposed by absorbing heat carried by the normal-temperature mixed gas through heat exchange between the cold and hot fluids, the hydrate slurry is converted into a gas phase flow and a water phase flow, and enters the gas-water separating unit through the delivery pump E, and the cooled mixed gas enters the reaction tower through a delivery pump C and a flow control valve A; and
   a main device of the gas-water separating unit is a gas-water separating tower, the gas phase flow and the water phase flow containing the xenon gas are injected from a middle position of the gas-water separating tower after being pressurized by the delivery pump E, under an action of gravity, the xenon gas is separated from the decomposed water, wherein the xenon gas rises to the top of the tower, and is discharged by a flow control valve E after being dehumidified by a drying bed; and the decomposed water sinks to the bottom of the tower, and enters the heat exchanger B to participate in the heat exchange after being pressurized by a delivery pump F.

2. The system for separating the xenon-krypton mixed gas by the hydrate formation process according to claim 1, wherein under a working condition of a large mixed gas treatment capacity, the system further comprises a refrigerator A and a refrigerator B, which are respectively used for auxiliary cooling of the xenon-krypton mixed gas from the heat exchanger A and the decomposed water from the heat exchanger B to ensure that pre-cooling temperatures of the mixed gas and the decomposed water reach set temperatures of the working condition; and an electric heating device performs auxiliary heating on the gas phase flow and the water phase flow from the heat exchanger A and the heat exchanger B to ensure that the hydrate particle in the fluid is completely decomposed.

3. The system for separating the xenon-krypton mixed gas by the hydrate formation process according to claim 1, wherein the porous tray is made of plate-like foamy copper with a porosity of 40% to 50% obtained by powder metallurgy or electroplating; and surface treatment is performed on the foamy copper by a dry corrosion method to increase a roughness of a metal surface, thus providing more sites for hydrate nucleation.

4. A method for operating the system for separating the xenon-krypton mixed gas by the hydrate formation process according to claim 1, comprising the following steps:
   step 1: injecting normal-temperature water from a side surface of the top of the reaction tower, wherein the water flows through all porous trays from top to bottom, then converges in the space enclosed by the gas-liquid separating membrane and the tower wall, and enters and is stored in the gas-water separating tower after passing through the fluid diversion device, the heat exchanger A and the heat exchanger B as the hot fluid of the heat exchanger when the system is started up;

step 2: adjusting the back-pressure control valve at the top of the reaction tower to a preset working condition pressure; injecting the pre-cooled water from the side surface of the reaction tower, after wetting the porous tray, injecting the pre-cooled xenon-krypton mixed gas from the bottom of the tower to generate the xenon hydrate with water on the porous tray, increasing an inlet water flow by the flow control valve F, so that the water washes the hydrate particle on the tray into the space enclosed by the gas-liquid separating membrane and the tower wall, and the hydrate particle converges into the hydrate slurry to enter the heat exchanging unit; and discharging the residual gas from the top of the tower;

step 3: starting up the fluid diversion device to divide the hydrate slurry into two paths, wherein one path of the hydrate slurry enters the heat exchanger B as the cold fluid, the delivery pump F at the bottom of the gas-water separating tower is started up, the pre-stored normal-temperature water enters the heat exchanger B as the hot fluid, after heat exchange, the hydrate particle in the cold fluid is decomposed, and converted into the gas phase flow and the water phase flow to enter the gas-water separating unit, the cooled water is injected into the reaction tower through the pump, after the whole system is operated, the normal-temperature water is replaced by the decomposed water from the gas-water separating unit, and the decomposed water enters the heat exchanger B as the hot fluid; and the other path of the hydrate slurry enters the heat exchanger A as the cold fluid, the delivery pump D is started up, the mixed gas to be separated is injected into the heat exchanger A as the hot fluid, after heat exchange, the hydrate particle in the cold fluid is decomposed, and converted into the gas phase flow and the water phase flow to enter the gas-water separating unit, and the cooled mixed gas is injected into the reaction tower through the delivery pump C; and step 4: starting up the delivery pump E to inject the gas phase flow and the water phase flow from the middle position of the gas-water separating tower, and separating the xenon gas from the decomposed water under the action of gravity, wherein the xenon gas moves upwards to the drying bed and is produced after dehumidification; and the decomposed water converges at the bottom of the tower, and enters the heat exchanger B as the hot fluid through the delivery pump F.

* * * * *